(12) United States Patent
Geary et al.

(10) Patent No.: US 8,364,144 B2
(45) Date of Patent: Jan. 29, 2013

(54) SYSTEM INFORMATION CACHE

(75) Inventors: Stuart I. Geary, Fleet (GB); Steven Franklin, Guildford (GB); James Howard Tooley, London (GB)

(73) Assignee: Renesas Mobile Corporation, Tokyo (JP)

(*) Notice: Subject to any disclaimer, the term of this patent is extended or adjusted under 35 U.S.C. 154(b) by 0 days.

(21) Appl. No.: 13/275,885

(22) Filed: Oct. 18, 2011

(65) Prior Publication Data

US 2012/0315945 A1 Dec. 13, 2012

Related U.S. Application Data

(63) Continuation of application No. 13/155,510, filed on Jun. 8, 2011.

(30) Foreign Application Priority Data

Jun. 8, 2011 (GB) .................................... 1109593.2

(51) Int. Cl.
*H04W 4/00* (2009.01)
(52) U.S. Cl. .................................. 455/432.1; 455/435.2
(58) Field of Classification Search .................. 455/437, 455/452.2, 436, 450, 432.1
See application file for complete search history.

(56) References Cited

U.S. PATENT DOCUMENTS

| 6,628,946 | B1 | 9/2003 | Wiberg et al. ................ 455/434 |
| 6,993,334 | B2 * | 1/2006 | Andrus et al. ................ 455/437 |
| 2006/0264215 | A1 | 11/2006 | Ekstedt et al. ............. 455/435.2 |
| 2007/0275701 | A1 * | 11/2007 | Jonker ....................... 455/414.1 |
| 2010/0195568 | A1 | 8/2010 | Iimori ........................... 370/328 |

FOREIGN PATENT DOCUMENTS

| CN | 101841868 A | 9/2010 |
| EP | 1 874 075 A2 | 1/2008 |
| EP | 2 117 274 A1 | 11/2009 |
| WO | WO 2008/114137 A2 | 9/2008 |
| WO | WO-2010/008844 A1 | 1/2010 |
| WO | WO 2011/100707 A1 | 8/2011 |

* cited by examiner

*Primary Examiner* — Tu X Nguyen
(74) *Attorney, Agent, or Firm* — Harrington & Smith

(57) ABSTRACT

For each of a plurality of received system information SI a cache entry is stored in a SI cache of a user equipment UE, each including at least some of the received SI, a timestamp of when the SI was first stored, and at least some of the cache entries also have relevance data relating the respective cache entry to one or more other cache entries. While the UE is in a state such as a CELL-FACH state, a cache entry is selected for at least one neighbor cell, and that cache entry is related by its relevance data to the cache entry of the serving cell or determined from its timestamp to be in close proximity to the serving cell. The UE then identifies the selected neighbor cell in an uplink message as a suitable candidate for multipoint communications with the UE.

21 Claims, 5 Drawing Sheets

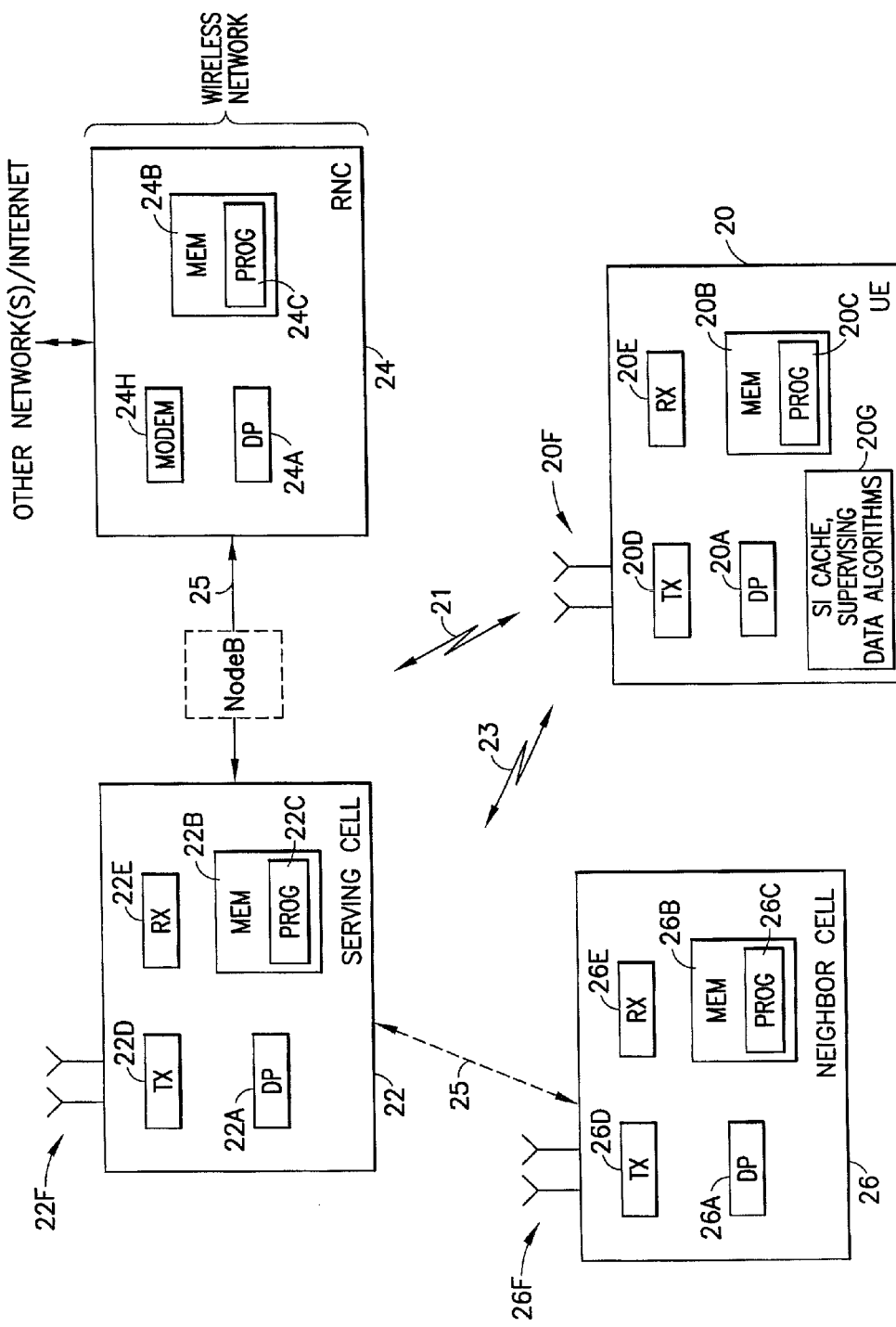

SYSTEM INFORMATION CACHE

CROSS REFERENCE TO RELATED APPLICATION

This application is a continuation application under 35 USC §120 and 37 CFR 1.53(b) of co-pending U.S. patent application Ser. No. 13/155,510, filed on Jun. 8, 2011; and this application further claims benefit under 35 U.S.C. §119 (a) and 37 CFR 1.55 to UK Patent Application GB1109593.2, filed on Jun. 8, 2011.

FIELD OF THE INVENTION

The exemplary and non-limiting embodiments of this invention relate generally to wireless communication systems, methods, devices and computer programs and, more specifically, relate to a user device storing/caching system information from neighbor cells and using that cached system information.

BACKGROUND OF THE INVENTION

The following abbreviations that may be found in the specification and/or the drawing figures are defined as follows:

| | |
|---|---|
| 3GPP | third generation partnership project |
| BMC | broadcast/multicast control |
| DL | downlink (network towards UE) |
| E-DCH | enhanced dedicated (physical) channel |
| E-HICH | E-DCH HARQ acknowledgement indicator channel |
| E-RGCH | E-DCH relative grant channel |
| E-RNTI | E-DCH radio network temporary identifier |
| FACH | forward access channel |
| HARQ | Hybrid Automatic Repeat Request |
| H-RNTI | HS-DSCH radio network temporary identifier |
| HSDPA | high speed downlink packet access |
| HS-DSCH | high speed downlink shared channel |
| HSPA | high speed packet access |
| MBMS | multimedia broadcast/multicast service |
| NCL | neighbor cell list |
| Node B | base station |
| PLMN | public land mobile network |
| RF | radio frequency |
| RNC | radio network controller |
| RRC | radio resource control |
| SI | system information |
| UCID | unique cell identifier |
| UE | user equipment |
| UL | uplink (UE towards network) |
| UTRAN | universal terrestrial radio access network |
| WCDMA | Wideband Code Division Multiple Access |

Continuing improvements of the UTRAN system have recently included the investigation of a CELL-FACH enhancement which in part intends to improve cell reselection. A UE in the CELL-FACH state has no dedicated physical channel allocated to it, but instead it continuously monitors the FACH in the DL and is assigned a random access channel RACH for accessing an uplink transport channel. While in the CELL-FACH state the UE can have only one serving cell, and so it performs cell reselection according to specified reselection rules, typically to change the current serving cell to a better quality neighbor cell.

In current specifications the UE does this by first obtaining the SI of the neighbor cell (which takes typically 1.28 seconds) then sends a cell update message upon cell reselection while in the CELL-FACH state. The network then provides in a Cell Update Confirm message a dedicated resource on the new serving cell for the UE. The cell update procedure can take up to a full second to perform, and so until it is complete the UE cannot perform user data transmission and reception. This means that there is a time, on the order of up to a few seconds, during which service is disrupted due to the cell reselection.

The UEs utilize the various cells' SI for many purposes, including determining if the UE is allowed to attempt reselection to that cell and the configuration the UE should use to do so. This means that the UE must have the SI of the cell to which it attempts to reselect even before beginning the cell reselection process. This fact gives rise to two issues for obtaining the neighbor cell's SI, which the cell transmits on its broadcast channel. First, it may take several seconds for the UE to obtain the SI meaning access to the cell can be delayed. Second, there are certain UE connection states, such as the CELL-FACH state noted above, during which the UE cannot read the neighbor cell's SI (or at least the UE's reading of it is limited).

The UE is allowed to cache SI. In this regard, the UTRAN system provides at 3GPP TS 25.331 v8.1.1.3:

The UE may store system information blocks with cell, PLMN or Equivalent PLMN area scope (including their value tag if applicable) for different cells and different PLMNs, to be used if the UE returns to these cells.

But any given UE over time transits through quite a large number of cells, so storing every cell's SI quickly becomes an issue of memory management. Additionally, while any given cell's SI typically remains static, SI is in fact semi-dynamic and so the SI which a UE stores in the morning may or may not be valid for that same cell when the UE passes through it again in the afternoon.

SUMMARY OF THE INVENTION

The foregoing and other problems are overcome, and other advantages are realized, by the use of the exemplary embodiments of this invention.

In a first exemplary aspect of the invention there is a method of system information cache management comprising: for each of a plurality of system information received from respective cells, storing in a system information cache of a user equipment a cache entry including at least some of the received system information, a timestamp of when the respective system information was first stored in the system information cache, and for at least some of the cache entries relevance data relating the respective cache entry to one or more other cache entries; while the user equipment is in a state with a serving cell in which no dedicated physical channel is allocated to the user equipment, selecting a cache entry for at least one neighbor cell that is related by its relevance data to the cache entry of the serving cell or determined from its timestamp to be in close proximity to the serving cell; and identifying the selected neighbor cell in an uplink message as a suitable candidate for multipoint communications with the user equipment.

In a second exemplary aspect of the invention there is computer software adapted to perform the method of the first aspect.

In a third exemplary aspect of the invention there is apparatus for use in system information cache management comprising a processing system, for example comprising at least one processor and at least one memory storing a computer program. In this embodiment, the processing system is configured to cause the apparatus to at least: for each of a plurality of system information received from respective cells, store in a system information cache of a user equipment a cache entry including at least some of the received system information, a timestamp of when the respective system information was first stored in the system information cache, and for at least some of the cache entries relevance data relating the respective cache entry to one or more other cache entries; while the user equipment is in a state with a serving cell in which no dedicated physical channel is allocated to the user equipment, select a cache entry for at least one neighbor cell that is related by its relevance data to the cache entry of the serving cell or determined from its timestamp to be in close proximity to the serving cell; and identify the selected neighbor cell in an uplink message as a suitable candidate for multipoint communications with the user equipment.

In a fourth exemplary aspect of the invention there is a computer readable memory for use in system information cache management, the computer readable memory storing a computer program comprising a set of instructions, which when executed by a computerised device, cause the device to: for each of a plurality of system information received from respective cells, store in a system information cache of a user equipment a cache entry including at least some of the received system information, a timestamp of when the respective system information was first stored in the system information cache, and for at least some of the cache entries relevance data relating the respective cache entry to one or more other cache entries; while the user equipment is in a state with a serving cell in which no dedicated physical channel is allocated to the user equipment, select a cache entry for at least one neighbor cell that is related by its relevance data to the cache entry of the serving cell or determined from its timestamp to be in close proximity to the serving cell; and identify the selected neighbor cell in an uplink message as a suitable candidate for multipoint communications with the user equipment.

In a fifth exemplary aspect of the invention there is apparatus substantially as herein described with reference to the accompanying drawings.

BRIEF DESCRIPTION OF THE DRAWINGS

FIG. 6 is a simplified block diagram of the UE and a NodeB from FIG. 1 and also a higher network node, which are exemplary electronic devices suitable for use in practicing the exemplary embodiments of this invention.

DETAILED DESCRIPTION OF THE INVENTION

Figure 1:
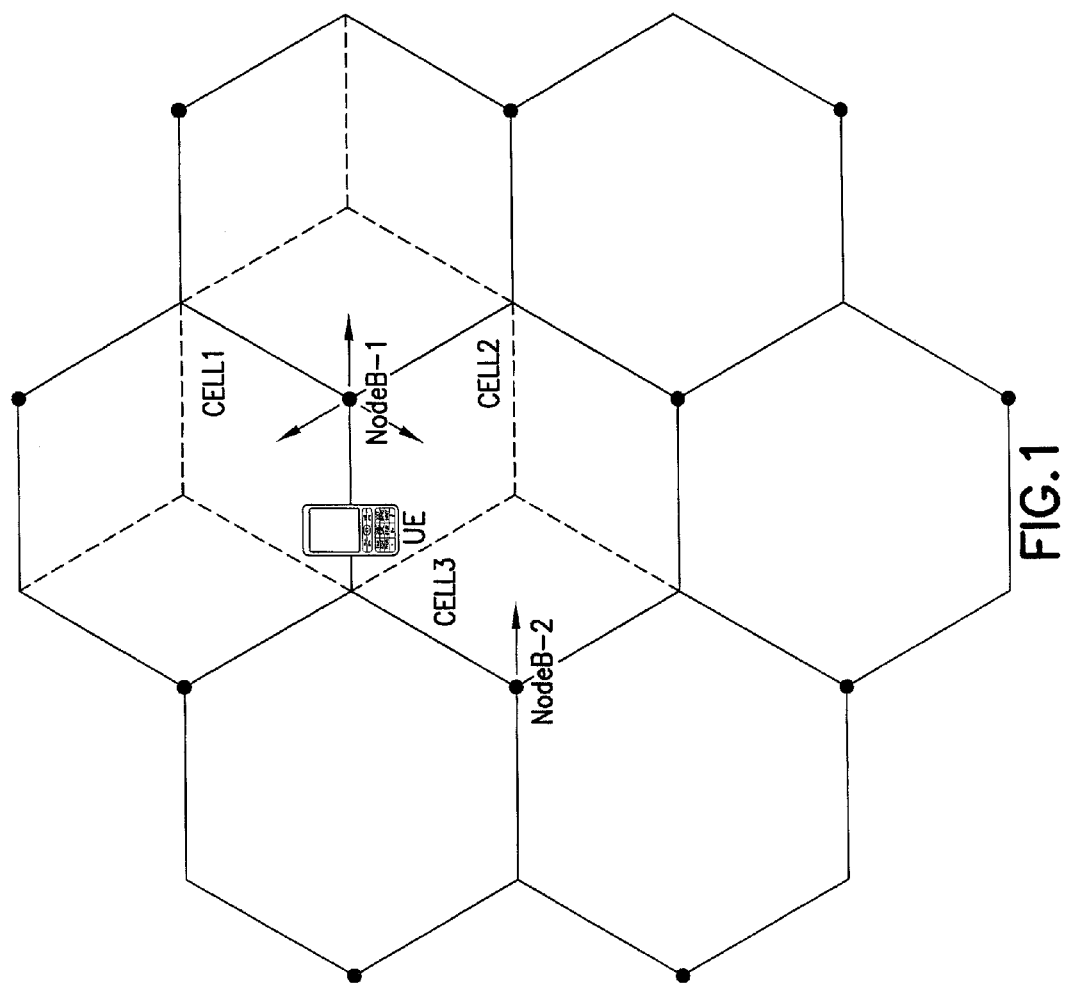
FIG. 1 is a schematic diagram of adjacent NodeBs with a UE moving amongst their cells and is an environment in which embodiments of the invention may be advantageously practiced.

Consider FIG. 1 which illustrates an exemplary environment in which exemplary embodiments of the invention may be practiced to advantage.

There is a UE in a CELL-FACH state and under control of a serving cell denoted as cell1. The UE is moving towards two neighbor cells, cell2 and cell3. Cell2 is in the same NodeB-1 group as the serving cell1, while cell3 is in a different NodeB-2 group. Conventionally the geographic area controlled by a NodeB is served by directional antennas. Each NodeB may control several cells, typically arranged in different sectors (e.g., three or six sector sites). While cell and cell2 may be considered from the network perspective different sectors of the same NodeB cell, since each sector has a different physical configuration the UE sees each sector as a different cell, and each of those different cells broadcast its own SI. Similarly, if a NodeB also has relay nodes and/or remote radio heads, the UE will also see those as separate cells rather than distinct sectors under a given NodeB's control. The description below uses the term cell in reference to the network access node which controls a sector (or which controls an entire NodeB geographic area if there are no sector divisions).

The exemplary embodiments of the invention below are described in the initial context of the UE in the Cell-FACH state moving away from its serving cell towards neighbor cell2 and neighbor cell3 so that the UE's received signal strength from cell is diminishing while that from cell2 and cell3 is increasing. While these examples are also in the context of the UTRAN system and specifically HSDPA, such context is for clarity of description and is not itself a limitation; these teachings may be employed in that and in other radio access technologies such as evolved UTRAN, WCDMA and others.

As was noted in the background section above, the UE in the CELL-FACH state (or more generally in a state with the serving cell in which no dedicated physical channel is allocated to the UE) will not be able to read SI of the neighbor cells, or at best will be able to read only portions of SI. So in order to reselect to cell2 or cell3 without interruption to data transfer, the UE must have cached the SI of the target cell, at a time prior to the UE knowing which is to be its next target cell.

Figure 2:
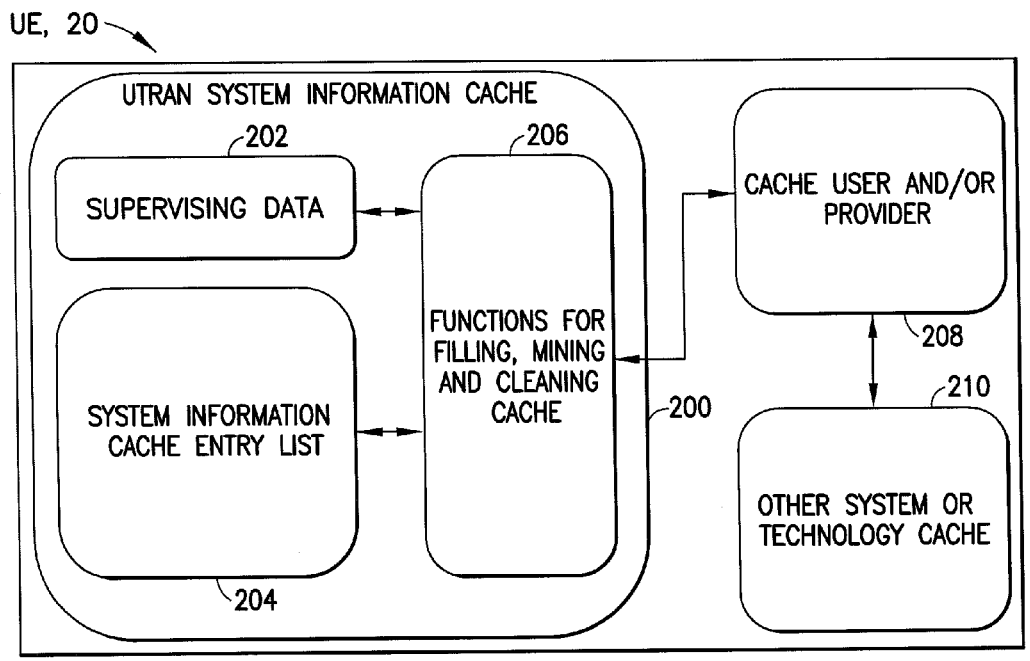
FIG. 2 is a functional diagram of a user device having a cache memory operated according to an exemplary embodiment of these teachings.

Embodiments of these teachings relate to supervising the collection of the SI which the UE caches in a manner that optimizes the benefit of the cache. Typically UEs will have a finite memory capacity which can be used for SI cache purposes, so as to assure there is sufficient memory available for other purposes such as transmit buffering, HARQ processes, radio configuration storage, and the like. In the description below the term cache entry refers to the SI for one particular cell, along with other data specifically related to that cached SI as will be detailed by example. The description below first describes collection of the cache entries and management of their storage, and thereafter describes usage of these cached entries. FIG. 2 illustrates functionally the user device which stores the cache entries and FIG. 3 is a logic flow diagram illustrating the supervision of storing the cache entries and managing the data set/physical memory by cleaning older and/or less relevant previously entered cache entries.

The UE 20 has a certain amount of memory allocated for SI, shown at 200 in FIG. 2. Within that SI cache 200 are the cache entries 204 themselves (which include UE-created data points which are not in the broadcast SI as detailed below), supervising data 202 which are not broadcast in the SI itself, but which the UE 20 creates for list-management purposes (also as detailed below), and functions or algorithms for filling (e.g., for creating the UE-created data points of the cache entries), mining (e.g., for finding/selecting which cache entries to utilize for multi-point communications as will be detailed with respect to FIG. 4) and cleaning (e.g., deleting cache entries) the SI cache 200 of older or less valuable data.

Block 208 broadly represents a cache user or provider 208 which is any other functional block(s) within the UE 20 which either harvests the SI data for storage (e.g., a broadcast radio receiver and related hardware) or which utilizes the data stored in the SI cache 200 (e.g., a processor which runs through the cache entries using the supervising data to select cells for multipoint communications). There is also stored in the UE 20, apart from the SI cache 200, one or more caches 210 for other systems or technologies. So for example if the UE 20 is a multi-radio device capable of operating on multiple radio access technologies as is common for newer cellular handsets, the SI cache 200 is for storing SI of UTRAN cells as FIG. 2 shows and there may be another SI cache 210 for storing SI or similar information for cells which operate according to WLAN, or E-UTRAN, or other radio access technology. Such other caches 210 may or may not also be managed according to these teachings; the description herein assumes the non-limiting example of a SI cache 200 for the SI of cells in a UTRAN system.

Figure 3:
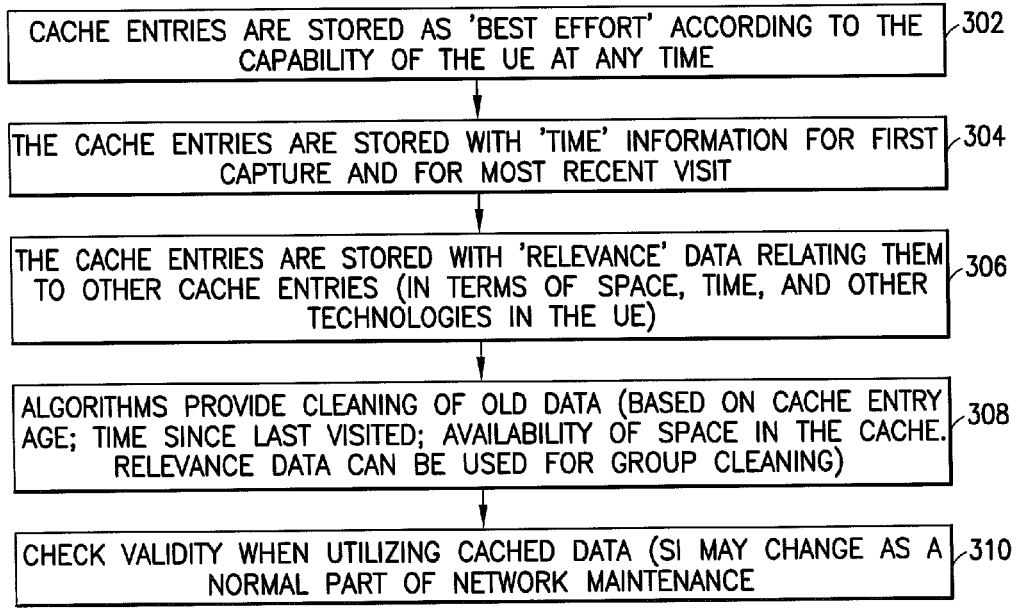
FIG. 3 is a logic flow diagram illustrating exemplary steps for storing cache data in the memory of FIG. 3 and managing that data to remove certain cache entries according to an exemplary embodiment of these teachings.

As the UE 20 moves in physical space among the cells, and among connection states which may or may not allow the UE to read broadcast SI, the UE 20 routinely expends at block 302 of FIG. 3 its 'best effort' to store cache entries, best effort being defined according to the capability of the UE. At various stages of protocol operation the UE has the ability to receive and store SI. This may be as the result of normal protocol operation or pro-active harvesting based on opportunity. That is, if a legacy UE can read only partial SI while in the CELL-FACH state then storing that partial SI represents its best effort, whereas a UE with receiver enhancements might be able to read a greater portion (or even full) SI regardless of its connection state and so that greater portion or full SI stored in the SI cache represents best effort of the receiver enhanced UE.

In an embodiment, all SI which the UE receives is stored regardless of the suitability of the cell. There is in this embodiment no assessment of suitability of a cell before a decision is made to cache its SI but rather the concept is to reduce future SI reception and accurately map the radio network.

Regardless of what constitutes best effort, each UE will attempt to collect or harvest SI on a regular basis. Such regular basis may in different embodiments be periodical, may be conditional on the received signal strength over the relevant broadcast channel exceeding some minimum threshold, or a combination of the two. In some embodiments there may be different time intervals and thresholds depending on the UE's current connection state; more frequent when in an active RRC Connected state and less frequent when in an idle state.

In an exemplary embodiment the individual cache entries 204 are stored in a list structure along with supervision data 202 which is relevant to the list as a whole. This supervision data 202 contains information about the size of the list 204, remaining space in the cache memory 200, and status of cleaning.

At block 304 of FIG. 3 the UE creates and adds to each newly-stored or newly-utilized cache entry at 204 time information, such as a time stamp indicating the date and time at which the cache entry was first added to the list and a time stamp indicating the last date and time at which the corresponding cache entry was last accessed. Additionally, the UE at block 306 of FIG. 3 can create relevance data for each cache entry, which is used to cross-link cache entries to one another. For example, if two cache entries are for cells within a same NodeB group, or geographically close to one another, that information is added as relevance data. The relevance data is also linked to other fingerprint data such as WiFi/WLAN cell information stored externally to the cellular modem. The UE might determine that two cells are geographically close to one another by the closeness of their respective original time stamps. Or it might determine geographical proximity whenever the UE receives the SI from multiple cells at the same time, without referencing the time stamps. Relevance data might also be based on multiple cells operating with the same radio access technology for which the UE is capable.

Block 308 of FIG. 3 details that there are algorithms (block 206 of FIG. 2) for controlling the cleaning of old data. This cleaning may by example be based on one or more considerations, such as on how long the cache entry has been stored in the cache memory 200, how long since the cell corresponding to a particular cache entry was last visited, and the amount of free space available in the SI cache 200. One or more of these algorithms may utilize the relevance data to group cache entries for cleaning purposes.

In an exemplary embodiment, cache entry maintenance is triggered at regular timed intervals and/or as a result of the list 204 becoming full (e.g., a minimum threshold of free memory in the SI cache 200 is reached). A time threshold may also be used to identify and clean cache entries which have not been accessed for a long period of time. This time threshold may be set initially to a default value and adjusted over time based on the normal daily cycle of the UE 20 once patterns are established. The cross reference/relevance data is updated as cache entries are removed so that retained cache entries do not cross-reference other cache entries which have been deleted.

In an exemplary embodiment, the cleaning algorithm has a preference to clean individual cache entries which are not cross linked because these entries are generally going to be less useful. This preference may be expressed as a more frequent cleaning of non-cross linked cache entries, or cleaning the non-cross linked cache entries prior to analyzing and cleaning the cross-linked cache entries.

Functions or algorithms are also provided to 'mine' the cache for useful information. These functions can be considered a separate activity to the filling and maintenance of the cache, and the mining can also use the relevance and cross linking data to select cache entries for use. In the example below the mining is for the specific purpose of selecting cells for setting up multipoint communications with a network. Other mining algorithms may be directed to other purposes using the same or relevance and cross linking information or other information which is used also to clean the SI cache 200.

The SI data may change as a normal part of network maintenance so the extent to which cached SI data is used must take this into account. For example, after the mining algorithm returns a set of cache entries for multipoint communications, the UE 20 may make an attempt to check validity of each selected cache entry prior to signaling the network the identity of the cells with which it seeks to establish multipoint communications. Such a validity check may be implemented by the UE checking a version number, value tags or other identifiers of the currently broadcast SI against the version number or other identifiers of the cache entry for the individual cells that the mining algorithm selected.

In one embodiment, the cache entries can be used to improve the UE's knowledge of its position. The UE 20 can obtain a more accurate position fix by combining the information from more cells. The time information is useful in order to know how fresh the cache entry is and the relevance data is useful in order to know which other cache entries can be combined. In this usage, the SI cache 200 serves as an enhancement to location fingerprinting. Cell identities of the combined cells can easily be determined.

In another embodiment, the UE 20 can use the cache 200 for knowledge about the current cell. The UE 20 may be limited in SI reception for the current cell based on its connected state. The SI cache 200 can provide information about the current cell which would otherwise not be known to the UE when in a connected state in which SI reception is not performed. This knowledge can be used to determine cell feature support, such as HSPA, MBMS or BMC, and cell identities which may not be communicated normally in some connected states.

There is also the added benefit of the cache entries allowing the UE to undergo certain state changes faster than if the UE 20 had to obtain the SI from broadcast channels on an as-needed basis. Such state changes in the UTRAN system include moving from a dedicated channel DCH to the paging channel PCH, and moving from a DCH to the FACH.

Consider below several examples for utilizing the SI cache 200 as that cache is detailed above. The examples below concern the UE using the SI cache 200 to obtain a better geographic position fix for itself, to evaluate handover candidates by service capability, to supplement the neighbor list which the network conventionally supplies, and to select cells to report to the network for multipoint communications.

In a first example, for positioning purposes the UE 20 may not know the unique cell identity UCID of the current cell when it is under network-controlled mobility, and the UE 20 may not know the UCID of nearby cells. Typically, the UE 20 uses the UCID of one or more cells as the primary method for getting an estimate of its geographic position. The UE 20 can turn to the SI cache 200 to determine the UCID of the cell in use, and also to obtain the UCID of other neighbor cells. These may be cells 'soft combined' under network control, or they may be cells which are known from the relevance data to relate to the cell in use. When combined, the list of UCIDs will provide superior location detection as compared to the case in which the UE 20 did not know which cells are neighbors to its serving cell. For example, the relevance data can associate the cache entries 204 for other cells to that of the current/serving cell through radio frequency, scrambling code and/or other fingerprint detection.

In a second example, the UE 20 can determine a reselection target based on service requirements, such as where a number of cells are suitable and otherwise equal (in signal strength). In conventional practice, the UE 20 would perform fast cell selection and not have the time to receive SI to evaluate multiple cells for their respective service capabilities, but with the cached entries the UE 20 can see that one of the handover candidates offers MBMS for example and prefer that cell over other cells which do not. In a similar vein, the UE 20 can use the knowledge about the current cell for displaying an accurate indication of cell capability on the display user interface.

In a third example, the UE may supplement the network-configured neighbor list with new neighbor cells which the UE 20 determines from the SI cache 200. The UE 20 may be limited in its SI reception when in a connected state. With regular harvesting, the UE is likely to have information on cells relating to the current cell, using the relevance data as mentioned above. The UE 20 can therefore use the SI cache 200 to autonomously select certain neighbor cells, in addition to those configured directly by the network. When the UE 20 is under network-controlled mobility, this supplemented list can be used to learn the surrounding radio network for the cases where coverage may be lost. If the UE 20 is under UE-controlled mobility then it can directly use the supplemented list. If we assume the SI cache 200 is presently up to date, then these teachings may be adopted into a standardized process whereby UEs facilitate enhanced mobility in all connected states by compiling such supplemented neighbor lists. The UE 20 can then provide such supplemented lists to the network for automatic neighbor relations ANR in order to self tune the network setup. In this manner, the network will automatically know if one of those UE-added neighbor cells is a better handover candidate for that UE 20 than any of the cells on the neighbor cell list which the network itself provided.

Figure 4:
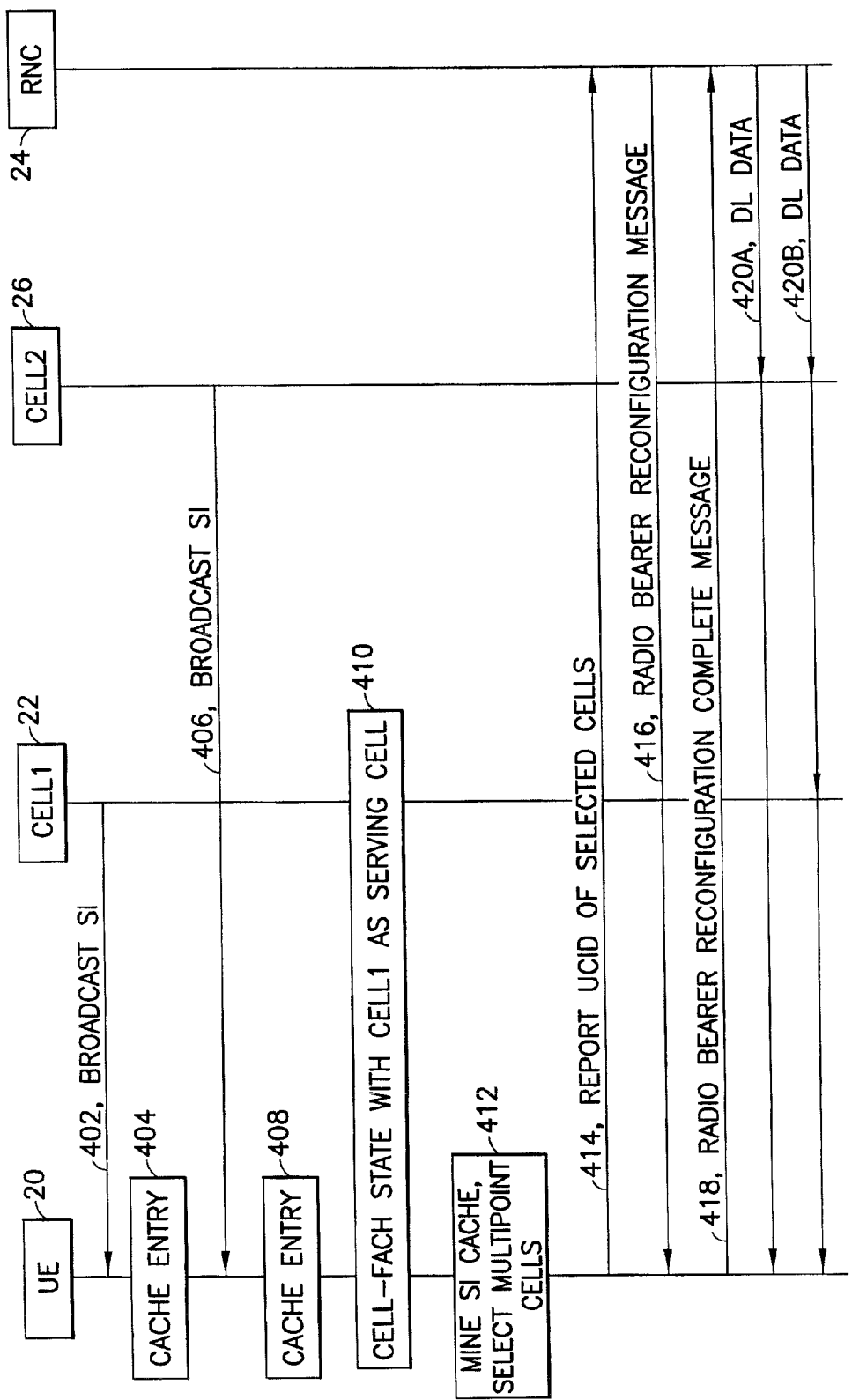
FIG. 4 is a signaling diagram illustrating mining the SI cache for identifying neighbor cells which are suitable for multipoint communications according to an exemplary embodiment of the invention.

FIG. 4 is an exemplary signaling diagram illustrating how mining of the SI cache 200 via the relevance data can be used to facilitate multipoint communications. The UE 20 receives broadcast SI 402 from cell1 (22) and enters it as a new cache entry at 404. The UE 20 also receives broadcast SI 406 from cell2 (26) and enters it as a new cache entry at 408. These SIs are collected according to the regular harvesting rules detailed above, and using the UE's best efforts. The UE 20 also adds its own relevance data to these cache entries 404, 408, and there may be many other cache entries for other cells not reflected in FIG. 4. The UE 20 then enters a CELL-FACH state at 410 with cell (22) as its serving cell.

The UE 20 recognizes that its received signal strength or signal quality with the serving cell (22) is decreasing, and so at block 412 decides to mine the SI cache 200 to find suitable cells for multipoint communications. Using the relevance data of the cache entry 404 for its serving cell, the mining algorithm 206 selects the cache entry 408 corresponding to cell2 (26) as a suitable multipoint communication candidate and excludes all others. By example, the mining algorithm may select that neighbor cell2 (26) based on a common NodeB group with cell1 (22), and/or by geographic proximity as determined by the various means noted above. NodeB group information may be broadcast by the cells themselves in their respective SI as an index or other indication. The cache entries 404, 408 have the UCID for each of those cells and so at 414 the UE 20 sends an UL RRC message (via its serving cell1) to the RNC 24 reporting that cell2 (26) is a suitable candidate for multipoint communications. This UL RRC message 414 may also have the UCID for the serving cell (22), and also may include measurement data for one or both of those cells 22, 26.

The RNC 24 responds with a DL RRC message 416 (Radio Bearer Reconfiguration, Radio Bearer Setup, Radio Bearer Release, Physical Channel Reconfiguration, or Transport Channel Reconfiguration message) which confirms to the UE 20 which cells will participate in the multipoint communication, and possibly also giving the UE 20 parameters for that multipoint communication such as a radio network temporary identifier RNTI which the UE 20 will use to identify cell2 (26) for such communications rather than its UCID. Specific to UTRAN, these parameters may include the H-RNTI for multipoint HS-DSCH reception operation and/or Primary E-RNTI, Secondary E-RNTI, E-RGCH, E-HICH for E-DCH for multipoint E-DCH transmission operation. Since cell (22) is the UE's serving cell the UE 20 already knows its RNTI. The UE 20 replies with a confirmation RRC message 418 (Radio Bearer Reconfiguration Complete, Radio Bearer Setup Complete, Radio Bearer Release Complete, Physical Channel Reconfiguration Complete, or Transport Channel Reconfiguration Complete message) once it begins monitoring cell2 (26), and following that confirmation message 418 the RNC 24 begins sending its DL data for the UE 20 to both the original serving cell (22) at 420B and also to the added neighbor cell2 (26) at 420A. These cells 22, 26 wirelessly transmit that same data DL to the UE 20 on a HS-DSCH for multipoint HSDPA operation in the CELL-FACH state.

The common channel configuration which the UE 20 needs for the multipoint communication with the two cells 22, 26 may be obtained autonomously by the UE 20 from mining the SI cache 200. In this case, the UE 20 would report such common channel configuration to the RNC 24 in the first UL RRC message 414. Alternatively, the common channel configuration may be sent to the UE 20 by the serving cell (22).

Prior to UL signaling of the selected cell(s) at message 414, the UE 20 may check validity of the cache entry 408 against the SI being currently broadcast by cell2 (26), but this check preferably is not a full reception by the UE 20 of the cell2 SI, but only a small portion for comparison against its respective cache entry 408. In this case, the UE 20 will include that cell's UCID in the UL RRC message 414 only if the validity check passes.

Figure 5:
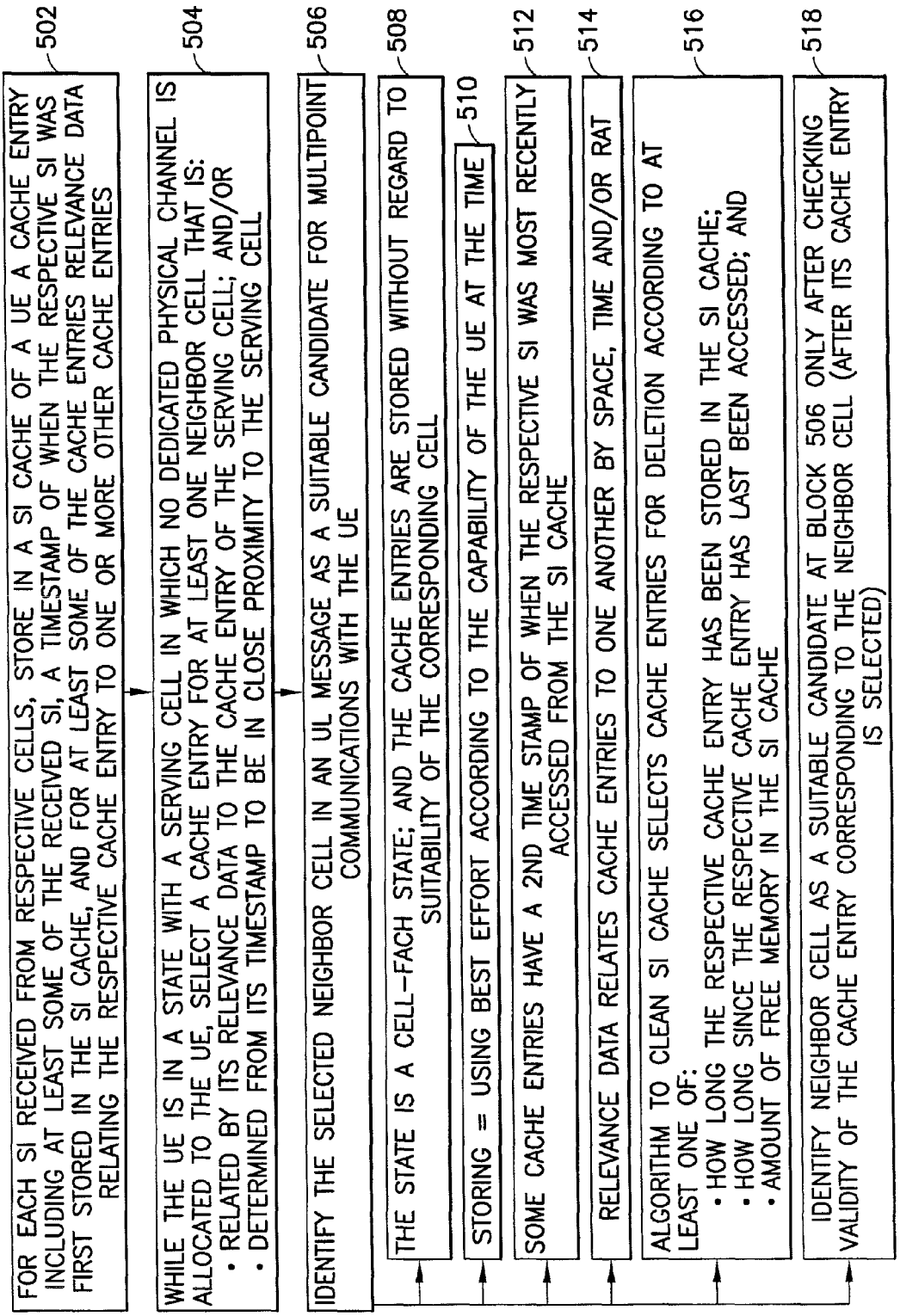
FIG. 5 is a logic flow diagram that illustrates the operation of a method, and a result of execution of computer program instructions embodied on a computer readable memory, in accordance with the exemplary embodiments of this invention.

Now are detailed with reference to FIG. 5 further particular exemplary embodiments from the perspective of the UE (or one or more components thereof). At block 502 of FIG. 5 is the cache entry storage. For each of a plurality of SI received from respective cells, there is stored in a SI cache of a UE a cache entry including at least some of the received SI, a first timestamp of when the respective SI was first stored in the SI cache, and for at least some of the cache entries relevance data relating the respective cache entry to one or more other cache entries. At block 504, while the user equipment is in a state with a serving cell in which no dedicated physical channel is allocated to the user equipment, there is selected a cache entry for at least one neighbor cell that is related by its relevance data to the cache entry of the serving cell. Or the selecting can be based on cache entry timestamps, which are used to determine that the respective neighbor cell is in close proximity to the serving cell. Either of these also include the case where the selecting is based on both relevance data and checking timestamps. And at block 506, the selected neighbor cell is identified in an uplink message as a suitable candidate for multipoint communications with the user equipment.

Further portions of FIG. 5 are optional and may or may not be combined with one another in various embodiments. At block 508, the state of block 504 is a CELL-FACH state, and the cache entries are stored at block 502 without regard to suitability of the corresponding cell. At block 510, storing the cache entries noted at block 502 includes, for each of the cache entries, using best effort according to the capability of the user equipment at the time the respective system information is received. At block 512, at least some of the cache entries comprise a second timestamp of when the respective system information was most recently accessed from the system information cache. Block 514 details that the relevance data relates cache entries to one another by at least one of space, time, and radio access technology RAT.

Block 516 concerns cleaning the cache, and the algorithm to do so selects cache entries for deletion according to at least one of: how long the respective cache entry has been stored in the system information cache; how long since the respective cache entry has last been accessed; and amount of free memory in the system information cache. In an embodiment, the algorithm prefers to select cache entries for deletion which are not grouped with any other cache entry. Such a preference may be exhibited by frequency or order of cache entry selection.

And finally at block 518, there is a validity check, by which the neighbor cell is identified at block 506 as a suitable candidate for multipoint communications with the UE only after checking validity of the cache entry corresponding to the neighbor cell after its cache entry is selected.

FIG. 5 is a logic flow diagram which may be considered to illustrate the operation of a method, and a result of execution of a computer program stored in a computer readable memory, and a specific manner in which components of an electronic device are configured to cause that electronic device to operate. The various blocks shown in FIG. 5 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Reference is now made to FIG. 6 for illustrating a simplified block diagram of various electronic devices and apparatus that are suitable for use in practicing the exemplary embodiments of this invention. In FIG. 6, a wireless network (serving cell 22, neighbor cell 26, and RNC 24) is adapted for communication over wireless links 21, 23 with an apparatus, such as a mobile terminal or UE 20. The network may include a network control element RNC 24, which provides connectivity with further networks (e.g., a publicly switched telephone network PSTN and/or a data communications network/Internet).

The UE 20 includes processing means such as a processing system comprising at least one data processor (DP) 20A and storing means such as at least one computer-readable memory (MEM) 20B storing at least one computer program (PROG) 20C, communicating means such as a transmitter TX 20D and a receiver RX 20E for bidirectional wireless communications with the node B 22 via one or more antennas 20F. Also stored in the MEM 20B at reference number 20G is the SI cache including the supervising data and the algorithms detailed more fully with respect to FIG. 2.

The serving cell 22 also includes processing means such as a processing system comprising at least one data processor (DP) 22A and storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. The neighbor cell is functionally similar with blocks 26A, 26B, 26C, 26D and 26E. There is also a data and/or control path 25 coupling the neighbor cell 26 and the serving cell 22 to the RNC 24 via the NodeB (if neither cell is the NodeB itself, such as if they are remote radio heads or relay nodes).

Similarly, the RNC 24 includes processing means such as a processing system comprising at least one data processor (DP) 24A, storing means such as at least one computer-readable memory (MEM) 24B storing at least one computer program (PROG) 24C, and communicating means such as a modem 24H for bidirectional communications with the cells 22, 26, 28 via the data/control path 25. While not particularly illustrated for the UE 20 or cells 22, 26, those devices are also assumed to include as part of their wireless communicating means a modem which may be inbuilt on an RF front end chip within those devices 20, 22, 26 and which also carries the TX 20D/22D/26D and the RX 20E/22E/26E.

At least one of the PROGs 20C in the UE 20 is assumed to include program instructions that, when executed by the associated DP 20A, enable the device to operate in accordance with the exemplary embodiments of this invention, as detailed more fully above. In this regard, the exemplary embodiments of this invention may be implemented at least in part by computer software stored on the MEM 20B which is executable by the DP 20A of the UE 20, or by hardware, or by a combination of tangibly stored software and hardware (and tangibly stored firmware). Electronic devices implementing these aspects of the invention need not be the entire UE 20, but exemplary embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

In general, the various embodiments of the UE 20 can include, but are not limited to: cellular telephones; data cards, USB dongles, personal portable digital devices having wireless communication capabilities including but not limited to laptop/palmtop/tablet computers, digital cameras and music devices, and Internet appliances.

Various embodiments of the computer readable MEM 20B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the UTRAN system, it should be appreciated that the exemplary embodiments of this invention are not limited for use with only this one particular type of wireless communication system, and that they may be used to advantage in other wireless communication systems such as for example GERAN, E-UTRAN and others.

Further, the various names used in the above description (e.g., CELL-FACH state, names of the various channels and messages) are not intended to be limiting in any respect, as different radio technologies may use different terms for similar concepts. Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

We claim:

1. A method of system information cache management, said method comprising:
for each of a plurality of system information received from respective cells, storing in a system information cache of a user equipment a cache entry including at least some of the received system information, a first timestamp of when the respective system information was first stored in the system information cache, and for at least some of the cache entries relevance data relating the respective cache entry to one or more other cache entries;
while the user equipment is in a state with a serving cell in which no dedicated physical channel is allocated to the user equipment, selecting a cache entry for at least one neighbor cell that is related by its relevance data to the cache entry of the serving cell and determined from its timestamp to be in close proximity to the serving cell; and
identifying the at least one neighbor cell corresponding to the selected cache entry in an uplink message as a suitable candidate for multipoint communications with the user equipment.

2. The method according to claim 1, in which the state is a CELL-FACH state, and the cache entries are stored without regard to suitability of the corresponding cell.

3. The method according to claim 1, in which storing in the system information cache comprises, for each of the cache entries, using best effort according to the capability of the user equipment at the time the respective system information is received.

4. The method according to claim 3, in which at least some of the cache entries comprise a second timestamp of when the respective system information was most recently accessed from the system information cache.

5. The method according to claim 1, in which the relevance data relates cache entries to one another by at least one of space, time, and radio access technology.

6. The method according to claim 1, further comprising executing an algorithm to select cache entries for deletion from the system information cache according to at least one of:
how long the respective cache entry has been stored in the system information cache;
how long since the respective cache entry has last been accessed; and
amount of free memory in the system information cache.

7. The method according to claim 6, in which the algorithm prefers, by frequency or order of cache entry selection, to select cache entries for deletion which are not grouped with any other cache entry.

8. The method according to claim, 1 in which the neighbor cell is identified in the uplink message as a suitable candidate for multipoint communications with the user equipment only after checking validity of the cache entry corresponding to the neighbor cell after its cache entry is selected.

9. An apparatus for use in system information cache management, said apparatus comprising a processing system configured to cause the apparatus to at least:
for each of a plurality of system information received from respective cells, store in a system information cache of a user equipment a cache entry including at least some of the received system information, a first timestamp of when the respective system information was first stored in the system information cache, and for at least some of the cache entries relevance data relating the respective cache entry to one or more other cache entries;
while the user equipment is in a state with a serving cell in which no dedicated physical channel is allocated to the user equipment, select a cache entry for at least one neighbor cell that is related by its relevance data to the cache entry of the serving cell and determined from its timestamp to be in close proximity to the serving cell; and
identify the at least one neighbor cell corresponding to the selected cache entry in an uplink message as a suitable candidate for multipoint communications with the user equipment.

10. The apparatus according to claim 9, wherein the state is a CELL-FACH state, and the cache entries are stored without regard to suitability of the corresponding cell.

11. The apparatus according to claim 9, wherein the processing system is configured to cause the apparatus to store in the system information cache each of the cache entries using best effort according to the capability of the user equipment at the time the respective system information is received.

12. The apparatus according to claim 11, wherein at least some of the cache entries comprise a second timestamp of when the respective system information was most recently accessed from the system information cache.

13. The apparatus according to claim 9, wherein the relevance data relates cache entries to one another by at least one of space, time, and radio access technology.

14. The apparatus according to claim 9, wherein the processing system is configured to cause the apparatus further to execute an algorithm to select cache entries for deletion from the system information cache according to at least one of:
- how long the respective cache entry has been stored in the system information cache;
- how long since the respective cache entry has last been accessed; and
- amount of free memory in the system information cache.

15. The apparatus according to claim 14, wherein the algorithm prefers, by frequency or order of cache entry selection, to select cache entries for deletion which are not grouped with any other cache entry.

16. The apparatus according to claim 9, wherein the neighbor cell is identified in the uplink message as a suitable candidate for multipoint communications with the user equipment only after checking validity of the cache entry corresponding to the neighbor cell after its cache entry is selected.

17. Apparatus according to claim 9, wherein the processing system comprises at least one processor and at least one memory storing a computer program.

18. A computer readable memory for use in system information cache management, said computer readable memory storing a computer program comprising a set of instructions, which when executed by a computerised device, cause the device to:
- for each of a plurality of system information received from respective cells, store in a system information cache of a user equipment a cache entry including at least some of the received system information, a first timestamp of when the respective system information was first stored in the system information cache, and for at least some of the cache entries relevance data relating the respective cache entry to one or more other cache entries;
- while the user equipment is in a state with a serving cell in which no dedicated physical channel is allocated to the user equipment, select a cache entry for at least one neighbor cell that is related by its relevance data to the cache entry of the serving cell and determined from its timestamp to be in close proximity to the serving cell; and
- identify the at least one neighbor cell corresponding to the selected cache entry in an uplink message as a suitable candidate for multipoint communications with the user equipment.

19. The computer readable memory according to claim 18, wherein:
- the state is a CELL-FACH state; and
- the cache entries are stored without regard to suitability of the corresponding cell.

20. The computer readable memory according to claim 18, wherein storing in the system information cache comprises for each of the cache entries, using best effort according to the capability of the user equipment at the time the respective system information is received; and
- at least some of the cache entries comprise a second time stamp of when the respective system information was most recently accessed from the system information cache.

21. The computer readable memory according to claim 18, wherein executing said computer program comprising said set of instructions causes said device to execute an algorithm to select cache entries for deletion from the system information cache according to at least one of:
- how long the respective cache entry has been stored in the system information cache;
- how long since the respective cache entry has last been accessed; and
- amount of free memory in the system information cache.

* * * * *